United States Patent [19]
Spaeth, Jr.

[11] 3,803,345
[45] Apr. 9, 1974

[54] CROSSARM

[76] Inventor: Edwin B. Spaeth, Jr., 1016 Ward Ln., Blytheville, Ark. 72315

[22] Filed: Mar. 12, 1973

[21] Appl. No.: 340,351

[52] U.S. Cl. ............ 174/149 R, 52/697, 174/45 R, 254/134.3 PA, 248/68 R, 248/221, D8/230, D26/12
[51] Int. Cl. ... E04h 12/24, H02g 7/20, H01b 17/00
[58] Field of Search ............. 174/2, 40 R, 45 R, 148, 174/149 R, 158 R; 52/40, 697, 721; 254/134.3 PA; 248/65, 68 R, 221; D8/230; D26/12

[56] References Cited
UNITED STATES PATENTS
| | | | |
|---|---|---|---|
| 1,149,282 | 8/1915 | Peirce, Jr. | 174/149 R X |
| 2,056,366 | 10/1936 | Richards et al. | 174/149 R UX |
| 3,235,652 | 2/1966 | Lindsey | 174/45 R |
| 3,499,973 | 3/1970 | Barnes | 174/149 R |

FOREIGN PATENTS OR APPLICATIONS
| | | | |
|---|---|---|---|
| 564,323 | 10/1923 | France | 52/697 |
| 743,175 | 1/1933 | France | 174/149 R |
| 533,607 | 9/1931 | Germany | 174/149 R |
| 385,043 | 12/1932 | Great Britain | 174/45 R |
| 2,756 | 12/1918 | Netherlands | 174/149 R |

*Primary Examiner*—Laramie E. Askin
*Attorney, Agent, or Firm*—Gravely, Lieder & Woodruff

[57] ABSTRACT

A crossarm for a utility pole possesses a curvilinear configuration and has looped supports distributed along the curvilinear configuration at different elevations for supporting ceramic insulators over which high voltage conductors are strung. At its upper end the crossarm has an open loop in which a pulley is mounted. The pulley supports a shield wire for protecting the conductors against lightning and further facilitates stringing the shield wire. The crossarm is made from plastic extrusions and moldings.

18 Claims, 7 Drawing Figures

CROSSARM

BACKGROUND OF THE INVENTION

This invention relates to an improved crossarm for utility poles.

The typical crossarm is made of wood and possesses a straight line configuration. Normally, these crossarms are mounted in pairs on utility poles with suitable bracing and are used to support several current lines, such as three current carrying wires of a high voltage transmission system, and in addition a shield wire usually strung over the tops of the poles to protect the current carrying wires from lightning.

The use of a pair of crossarms on each pole to support three wires from the pole presents an unsightly appearance and moreover leads to unequal force distributions of a substantial magnitude on the pole as well as between the arms themselves. Also, the installation of separate crossarms along with the bracing necessary to rigidify them is a time consuming procedure.

Aside from the foregoing, the shield wire must be strung by temporarily installing a pulley block at the top of the pole. This is a time consuming procedure.

SUMMARY OF THE INVENTION

One of the principle objects of the present invention is to provide a crossarm which is formed from plastic and is therefore extremely durable. Another object is to provide a crossarm which distributes the weight loading of the wires generally evenly on the utility poles. A further object is to provide a crossarm which facilitates the installation of a shield wire to protect the current carrying wires from lightning. An additional object is to provide a crossarm which is easily installed on utility poles without any additional bracing. These and other objects and advantages will become apparent hereinafter.

The present invention is embodied in a crossarm including angled cross members joined by connecting members and carrying looped insulator supports for the current carrying wires. It also resides in a crossarm having connectors located one above the other and a top support provided with a pulley which is used, not only to carry a shield wire, but to facilitate the stringing of the shield wire. The invention also consists in the parts and in the arrangements hereinafter described and claimed.

DESCRIPTION OF THE DRAWINGS

In the accompanying drawings which form part of the specification and wherein like numerals and letters refer to like parts wherever they occur.

DETAILED DESCRIPTION

Figure 1:
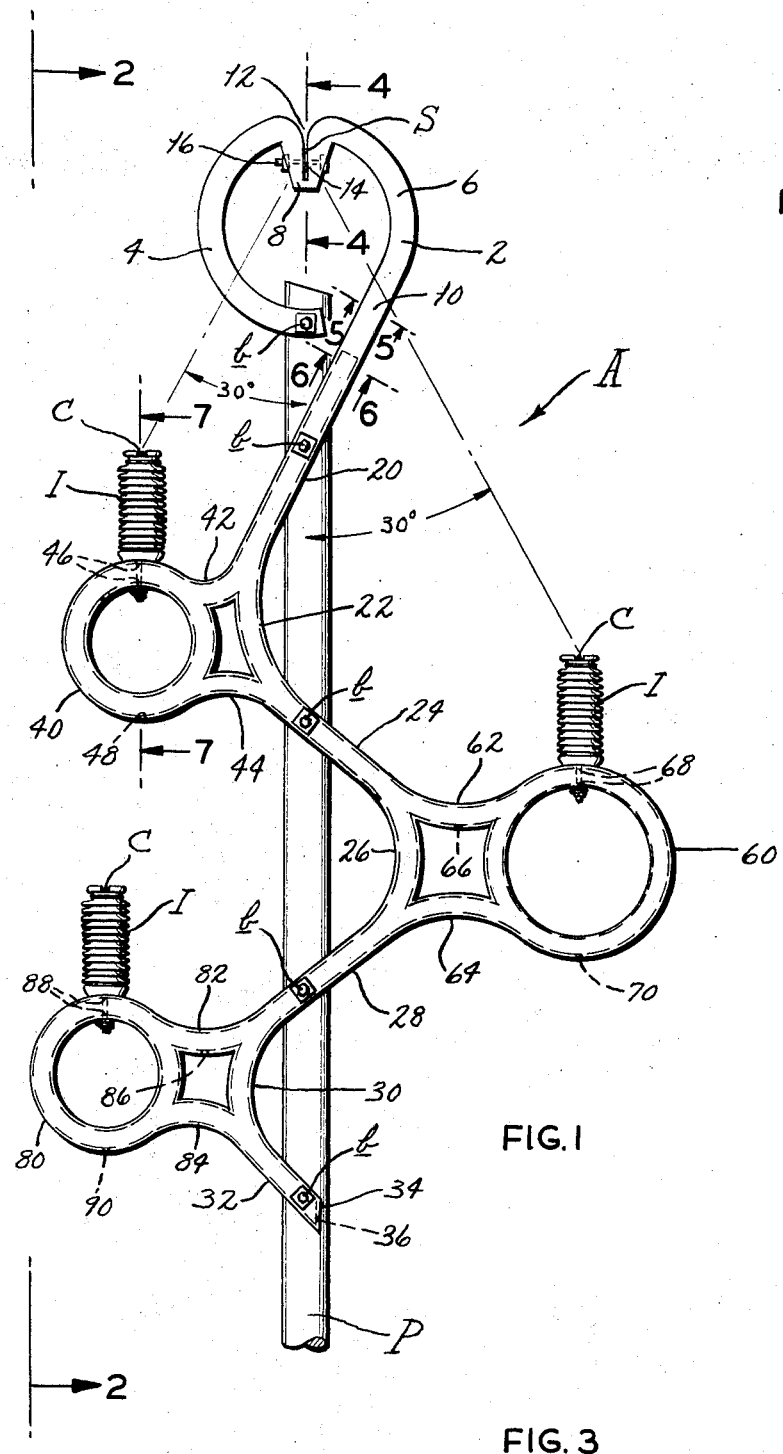
FIG. 1 is a front elevational view of a crossarm constructed in accordance with and embodying the present invention.
Figure 2:
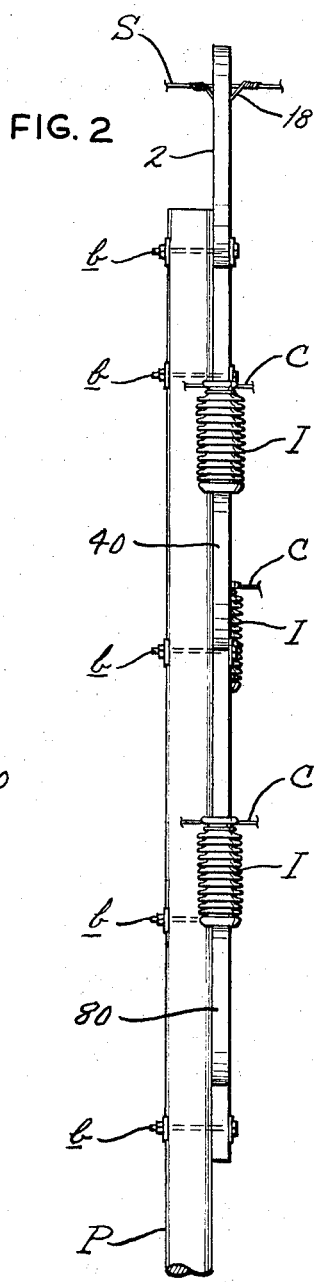
FIG. 2 is a side elevational view of the crossarm taken along line 2—2 of FIG. 1.
Figure 3:
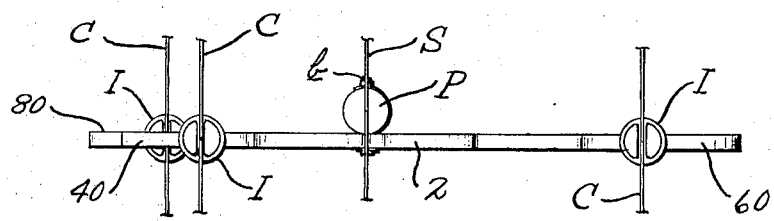
FIG. 3 is a top plan view.

Referring now to the drawings, A designates a crossarm which is secured to the upper end of the utility pole P for supporting three current carrying conductors C in an elevated position. In addition, the crossarm A supports a shield wire S above the three conductors C to minimize the chances of the conductors C being struck by lightning. The crossarm A is fabricated from plastic segments which are joined together with a suitable cement to form a unitary structure. Most of the segments are preferably extrusions, while some are moldings. The plastic is preferably polyvinyl chloride reinforced with asbestos or fiberglass fibers. The crossarm A is somewhat curvilinear in configuration and crosses over the utility pole P at several locations. At each location, the crossarm A is attached to the pole P by means of a bolt $b$.

Beginning at its upper end the crossarm A includes (FIG. 1) an open loop top support 2 for positioning the shield wire S, and this support for the most part is disposed about the top of the pole P. The open loop support 2 has two arcuate segments 4 and 6 which are joined by a V-shaped connector block 8 located at the top of the support 2. The arcuate segment 4 is almost a semicircle and at its lower end overlies the pole P, to which it is secured by the uppermost of the bolts $b$. The other arcuate segment 6 is somewhat shorter and merges into a straight segment 10 which also forms part of the support 2 and extends downwardly past the free end of arcuate segment 4 at an oblique angle to the axis of the pole P. The center line of the straight segment 10 is tangent to the center line of the arcuate segment 6. The straight segment 10 terminates slightly below the free end of the segment 4 and outwardly from the pole P.

The open loop support 2 is molded from plastic with the arcuate segments 4 and 6 being molded integrally with connector block 8 and the straight segment 10 being molded integrally with the arcuate segment 6. Moreover, the segments 4, 6 and 10 are solid throughout and are rectangular in cross section (FIG. 5) with their lesser dimension being perpendicular to the plane of the crossarm A.

Figure 4:
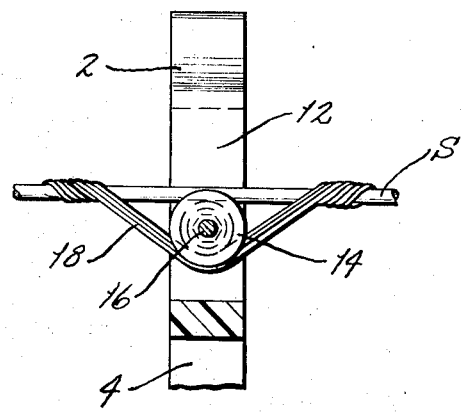
FIGS. 4, 5, 6 and 7 are sectional views taken along lines 4—4, 5—5, 6—6 and 7—7, respectively, of FIG. 1.

The V-shaped connector block 8 has an upwardly opening groove 12 in which a grooved pulley 14 is disposed (FIGS. 1 and 4), and this pulley 14 is journaled on an axle bolt 16 which is anchored in the two sides of the connector block 8 and traverses the groove 12 therein. The shield wire S passes through the groove 12 where it rests on and is supported by the pulley 14. Wound around the shield wire S on each side of the pulley 14 is a preformed tie 18 which passes beneath the pulley 14 and holds the shield wire S on the pulley 14 (FIG. 4).

Figure 6:
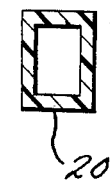

The remainder of the crossarm C is fabricated from plastic extrusions which are pieced together and permanently joined in the configuration illustrated and hereinafter described. Like the solid segments 4, 6 and 10 the extrusions are rectangular in crosssection with their lesser dimension perpendicular to the plane of the crossarm A and their greater dimension generally in the plane of the crossarm C. They are the same cross sectional size as the solid segments 4, 6 and 10. Moreover, the extrusions are hollow and when viewed in cross-section (FIGS. 6 and 7) the walls are of equal thickness. A typical dimension for the cross-section is 3 inches × 4 inches with the walls being ½ inch thick.

Figure 5:

Joined to the straight segment 10 of the open loop top support 2 is a straight cross member 20 (FIG. 1) which forms a continuation of the straight segment 10. Indeed, from outward appearances no discernible difference exists between the segment 10 and the member 20, but as to their interiors, the cross member 20 is hollow (FIG. 6), whereas the segment 10 is solid (FIG. 5). The cross member 20 extends obliquely with respect to the pole P and actually crosses the pole P, to which it is secured thereto by one of the bolts b. At its lower end the cross member 20 merges into an arcuate connecting member 22 which turns inwardly and at its lower end merges into another straight connecting member 24. The two cross members 20 and 24 at their center lines are tangent to the center line of the arcuate connecting member 22.

The straight cross member 24 likewise extends obliquely with respect to the pole P and crosses the pole P directly below the cross member 20. Another one of the bolts b extends through the straight cross member 24 and the pole P. Similarly, the cross member 24 at its lower end merges into an arcuate connecting member 26 which turns inwardly and merges into still another straight cross member 28 located beneath the cross member 24.

The cross member 28 also extends obliquely with respect to the pole P and at its center line is tangent to the center line of the arcuate connecting member 26. The straight cross member 28 is attached to the pole P by another one of the bolts b. At its lower end the straight cross member 28 also merges into an arcuate connecting member 30, and that connecting member in turn merges into a terminal cross member 32.

The terminal cross member 32 is straight and extends obliquely toward the pole P, terminating in front of it. The remaining bolt b is extended through the terminal end of the straight member 32 and into the pole P at this location. Both the cross member 28 and terminal member 32 at their center lines are tangent to the center line of the arcuate connecting member 30. The lower end of the terminal member 32 is covered with a cap 34 (FIG. 1) having a drain hole 36 therein for draining any water which enters or gravitates into the terminal member 32.

Thus, the hollow members 20, 22, 24, 26, 28, 30 and 32 together form a curvilinear mount which extends back and forth across the pole P with the cross members 20, 24, 28 and 32 crossing the pole one below the other and at oblique angles, and the connecting members 22, 26, and 30 being presented to the sides of the pole P. The curvilinear configuration is secured to the pole P at four locations by the bolts b.

Positioned outwardly from the arcuate connecting portion 22 is a full loop insulator support 40 (FIGS. 1 and 7) having the same cross sectional size and hollow shape as the members 20 to 32. The full loop support 40 is attached to the arcuate connecting member 22 by upper and lower arcuate connectors 42 and 44 which bow toward one another and are also of the same cross sectional configuration as the support 40. The connectors 42 and 44 merge into the connecting member 22 where the connecting member 22 joins the straight cross members 20 and 24. Indeed, the connectors 42 and 44 turn outwardly from the straight cross members 20 and 24, respectively, and away from the pole P, whereas the connecting member 22 turns inwardly toward the pole P. The connectors 42 and 44 position the full loop support 40 such that the center lines of the straight cross members 20 and 24 are tangent to the center line of that loop support 40. Moreover, the center line of the upper arcuate connector 42 is tangent to the center lines of both the straight cross member 20 and the insulator support 40, while the center line of the lower arcuate connector 44 is tangent to the center lines of both the cross member 24 and the insulator support 40.

Figure 7:
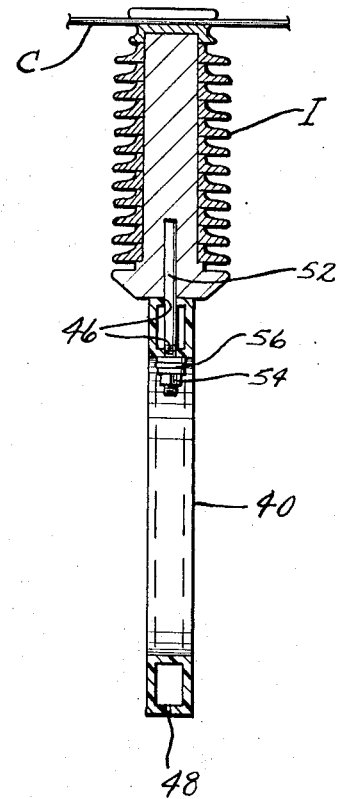

At the very top of the full loop support 40, the upper and lower walls thereof are provided with aligned holes 46 (FIGS. 1 and 7). At the very bottom of the full loop support 40, the bottom wall thereof is provided with a drain hole 48 to drain any water which may enter the interior of that portion of the crossarm C above which it is located.

The full loop insulator support 40 serves as a mount for a standard line post insulator I having a stud bolt 52 (FIG. 7) extended from it and through the aligned holes 46. The bolt 52 projects into the space encircled by the full loop support 40 where a nut 54 is threaded over it, and a spring washer 56 is interposed between the nut 54 and the loop support 40 to prevent the nut 54 from loosening when subjected to vibrations.

Positioned outwardly from the next arcuate connecting member 26, which is on the other side of the pole P, is another full loop insulator support 60, and this support is joined to the connecting member 26 at the ends thereof by upper and lower arcuate connectors 62 and 64 which are somewhat longer than their counterparts on the full loop support 40. The upper connector 62 bows downwardly and its bottom wall is provided with a drain hole 66 to drain any water which would otherwise accumulate therein. The arcuate connectors 62 and 64 position the full loop support 60 such that the center lines of the two straight cross members 24 and 28 are tangent to the center line of the loop support 60. Moreover, the center line of the arcuate connector 62 is tangent to the center line of the loop support 60 and to the center line of the cross member 24, while the center line of the lower connector 64 is tangent to the center lines of the loop support 60 and the cross member 28.

The loop support 60 is somewhat greater in diameter than the loop support 40 and is provided with aligned holes 68 through which the stud bolt 52 of another insulator I extends. The loop support 60 is provided with a drain hole 70 in its bottom wall.

Finally, the lowermost connecting member 30, which is on the same side of the pole P as the full loop support 40, has a loop support 80 positioned outwardly from it and connected to it by upper and lower connectors 82 and 84. The full loop support 80 is the same size as the loop support 40 above it, but is located further from the pole P. Again, the positioning is such that the center lines of the straight cross member 28 and straight terminal member 32 are tangent to the center line of the loop support 80. Moreover, the center line of the upper arcuate connector 82 is tangent to both the center line of the support 80 and the center line of the cross member 28, while the center line of the lower connector 84 is tangent to both the center line of the straight terminal member 32 and the center line of the loop support 80. Furthermore, the upper connector 82 bows downwardly and is provided with a drain hole 86 for draining water therefrom.

The full loop support 80 has aligned holes 88 for accommodating the stud bolt 52 of another insulator I so that the support 80 likewise serves as a mount for an insulator I. In addition, the full loop support 80 has a drain hole 90 in the bottom thereof.

The positioning of the full loop supports 40 and 60 is such that arcs swung about the shield wire S and through the conductors C attached to the insulators I, which are mounted on those supports 40 and 60, will describe an angle of not more than 30°. In other words, the shield wire S when used in conjunction with the crossarm A provides a 30° angle of protection from lightning (FIG. 1).

Some typical dimensions of the crossarm A are:
a. radius of open loop support 2 (to center line of arcuate segments 4 and 6) — 18 inches
b. width of groove in open loop support — 1 inch
c. radius of full loop supports 40 and 80 (to center lines thereof) — 12 inches
d. radius of full loop support 60 (to center line thereof) — 15 inches
e. distance between center of pole P and center of full loop support 40 — 30 inches
f. distance between center of pole P and center of full loop support 60 — 50 inches
g. distance between center of pole P and center of full loop support 80 — 36 inches
h. cross sectional size of crossarm A anywhere along it except at V-shaped connector block 8 — 3 inches × 4 inches.
i. wall thickness of crossarm at hollow portions thereof — ½ inch.

As previously noted, the crossarm A is attached to the pole P by five machine bolts b. Interposed between the head of each machine bolt b and the crossarm A is a 3 inch square washer and likewise between the crossarm A and the pole P is another 3 inch square washer. On the nut side of the bolt is a spring washer. The same crossarm A may be used to support 34 to 69 KV lines, and this simplifies inventory control. Moreover, being made of plastic, the crossarm A is quite strong and is not subject to decay.

Stringing the shield wire S over the crossarm A is a simple procedure involving merely placing the shield wire S in the groove 12 of the top support 2 and allowing it to come to rest on the pulley 14, and then pulling on the shield wire S to draw it into its proper position. This is much quicker than installing a temporary pulley block at the upper end of the pole P.

This invention is intended to cover all changes and modifications of the example of the invention herein chosen for purposes of the disclosure which do not constitute departures from the spirit and scope of the invention.

What is claimed is:

1. A crossarm for securement to an upright utility pole to support conductors in an elevated position, said crossarm comprising: a plurality of at least three cross members arranged in succession in the vertical direction and at oblique angles with respect to a vertical line intersecting each cross member, the ends of adjacent cross members being closer on one side of the vertical line than on the other side of the line so that the succession of cross members creates a generally serpentine configuration; looped support members for providing underlying support for the conductors, the support members being spaced outwardly from the closely spaced ends of adjacent cross members; and a pair of connectors extending between each looped support member and the closely spaced cross member ends opposite to which the support member is positioned so as to connect the looped support members to the cross members, the connectors of each pair being spaced apart in the vertical direction.

2. A crossarm according to claim 1 wherein the closely spaced ends of adjacent cross members are joined by connecting members and the looped support members are positioned outwardly from the connecting members.

3. A crossarm according to claim 2 wherein the cross members are straight and the connecting members are arcuate, the connecting members at their center lines being tangent to the center lines of the cross members they interconnect.

4. A crossarm according to claim 2 wherein the looped support members are circular and the cross members are straight.

5. A crossarm according to claim 3 wherein the center lines of the adjacent cross members are tangent to the center line of the circular looped support member positioned outwardly from the connecting member which interconnects the closely spaced ends of those adjacent cross members.

6. A crossarm according to claim 5 wherein the connectors of each pair are arcuate and have their convex faces presented toward one another and their center lines tangent to the center line of the circular support, the center line of the upper connector further being tangent to the center line of the upper of the two adjacent cross members beyond which the circular support member is located, and the center line of the lower connector further being tangent to the lower of the two adjacent cross members beyond which the circular support member is located.

7. A crossarm according to claim 2 wherein the cross members, the connecting members, the circular looped support members, and the connectors are all hollow and are formed from plastic.

8. A crossarm according to claim 1 and further characterized by a looped top support connected at one end to the upper end of the uppermost cross member and curving around to a free end located generally opposite to the upper end of the uppermost cross member, the top support being generally bisected by the vertical line and having an upwardly opening groove along the vertical line for receiving a shield wire.

9. A crossarm according to claim 1 and further characterized by apertures in the cross members along the vertical line for receiving devices for securing the crossarm to a pole.

10. A crossarm according to claim 1 wherein the connectors of each pair are arcuate and have their convex faces presented toward each other.

11. A crossarm for securement to an upright utility pole to support electrical conductors in an elevated position, said crossarm comprising: a plurality of at least three cross members arranged in succession in the vertical direction and at oblique angles with respect to a vertical line intersecting each cross member, the ends of adjacent cross members being closer on one side of the vertical line than on the other side of the line, connecting members located intermediate and interconnecting the closely spaced ends of adjacent cross members so that the succession of cross members and connecting members creates a generally serpentine configuration; and support members in the shape of closed loops for providing underlying support for the electrical conductors, the support members being located opposite to and spaced outwardly from the connecting members; and connector means joining the support members to the serpentine configuration formed by the cross members and the connecting members.

12. A crossarm according to claim 11 wherein the connecting members bow outwardly away from the vertical line so that their convex surfaces are presented toward the looped support members.

13. A crossarm according to claim 11 wherein the connector means comprises a pair of vertically spaced connectors extended between each looped support and the serpentine configuration formed by the cross members and the connecting members; the connectors being joined to the serpentine configuration at the junctures of the cross members and connecting members therein.

14. A crossarm for securement to an upright utility pole to support conductors in an elevated position, said crossarm comprising: a plurality of at least three cross members arranged in succession in the vertical direction and at oblique angles with respect to a vertical line intersecting each cross member, the ends of adjacent cross members being closer on one side of the vertical line than on the other side of the line so that the succession of cross members creates a generally serpentine configuration; support members for providing underlying support for the conductors, the support members being spaced outwardly from the closely spaced ends of adjacent cross members and connected to the cross members at the closely spaced ends thereof; a looped top support connected to the upper end of the uppermost cross member and curving upwardly across the vertical line and then downwardly to a position where it again intersects the vertical line, the top support having an upwardly opening groove for receiving a shield wire; and a pulley in the top support at the base of the groove for supporting the shield wire.

15. A crossarm according to claim 14 wherein that end of the curved top support opposite to the end which is connected to the upper crossarm is detached from the upper cross member and is provided with means for securing it to a pole.

16. A crossarm according to claim 14 wherein the pulley is located to position the shield wire so that it provides at least a 30° angle of protection for conductors carried by the support members below it.

17. A crossarm according to claim 14 wherein the top support comprises a pair of arcuate segments, one of which attaches to the pole and the other of which is connected with the uppermost cross member, and a connector block interconnecting the two arcuate segments, the upwardly opening groove being in the connector block.

18. A crossarm according to claim 17 wherein the top support is formed from plastic.

* * * * *